(12) United States Patent
Shi et al.

(10) Patent No.: US 9,908,680 B2
(45) Date of Patent: Mar. 6, 2018

(54) TREE-FREE FIBER COMPOSITIONS AND USES IN CONTAINERBOARD PACKAGING

(71) Applicant: Kimberly-Clark Worldwide, Inc., Neenah, WI (US)

(72) Inventors: Bo Shi, Neenah, WI (US); Mark M Mleziva, Appleton, WI (US); Brent M Thompson, Oshkosh, WI (US); Robert J Zelenak, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 397 days.

(21) Appl. No.: 14/039,576

(22) Filed: Sep. 27, 2013

(65) Prior Publication Data

US 2014/0093705 A1    Apr. 3, 2014

Related U.S. Application Data

(63) Continuation-in-part of application No. 13/631,183, filed on Sep. 28, 2012.

(51) Int. Cl.
*B65D 81/05* (2006.01)
*B65D 65/40* (2006.01)
(Continued)

(52) U.S. Cl.
CPC ............... *B65D 81/05* (2013.01); *B32B 3/28* (2013.01); *B32B 7/12* (2013.01); *B32B 29/005* (2013.01); *B65D 65/403* (2013.01); *B65D 65/466* (2013.01); *D21H 11/12* (2013.01); *D21H 27/10* (2013.01); *D21H 27/40* (2013.01); *B32B 29/08* (2013.01); *B32B 2250/26* (2013.01);
(Continued)

(58) Field of Classification Search
CPC .... B65D 65/403; B65D 65/466; B65D 81/05; B32B 3/28; B32B 7/12; B32B 29/08; B32B 2250/42; B32B 2262/065; Y10T 428/24694

See application file for complete search history.

(56) References Cited

U.S. PATENT DOCUMENTS

| | | |
|---|---|---|
| 1,829,852 A | 11/1931 | Darling |
| 2,388,592 A | 11/1945 | Asplund et al. |

(Continued)

FOREIGN PATENT DOCUMENTS

| | | |
|---|---|---|
| FR | 2 756 571 A1 | 6/1998 |
| GB | 508671 A | 7/1939 |

(Continued)

OTHER PUBLICATIONS

Co-pending U.S. Appl. No. 13/631,183, filed Sep. 28, 2012, by Shi et al. for "Hybrid Fiber Compositions and Uses in Containerboard Packaging."

*Primary Examiner* — Donald J Loney
(74) *Attorney, Agent, or Firm* — Kimberly-Clark Worldwide, Inc.

(57) ABSTRACT

A containerboard packaging material includes at least one linerboard layer including tree-based pulp material and at least one fluted medium layer including tree-free pulp material, wherein the tree-free pulp material is present in the medium layer in an amount of from about 5% to about 100%. The medium layer pulp material can be tree-free pulp material. The tree-free pulp material can be wheat straw pulp and red algae pulp.

11 Claims, 2 Drawing Sheets

(51) Int. Cl.
  *B65D 65/46* (2006.01)
  *B32B 7/12* (2006.01)
  *B32B 3/28* (2006.01)
  *B32B 29/00* (2006.01)
  *D21H 27/10* (2006.01)
  *D21H 27/40* (2006.01)
  *D21H 11/12* (2006.01)
  *B32B 29/08* (2006.01)

(52) U.S. Cl.
  CPC ..... *B32B 2250/40* (2013.01); *B32B 2262/065* (2013.01); *B32B 2262/067* (2013.01); *B32B 2307/54* (2013.01); *B32B 2439/00* (2013.01); *Y10T 428/24694* (2015.01)

(56) References Cited

U.S. PATENT DOCUMENTS

| | | | |
|---|---|---|---|
| 2,862,813 A | 12/1958 | Birdseye | |
| 2,965,436 A | 12/1960 | De Domenico et al. | |
| 4,007,084 A | 2/1977 | Chan et al. | |
| 4,040,899 A | 8/1977 | Emerson | |
| 4,102,738 A | 7/1978 | Dzurik | |
| 4,597,930 A | 7/1986 | Szal | |
| 5,258,087 A | 11/1993 | Symons | |
| 5,472,569 A | 12/1995 | Nicolucci et al. | |
| 5,500,086 A | 3/1996 | Sakai et al. | |
| 5,985,147 A | 11/1999 | Jensen et al. | |
| 6,074,856 A | 6/2000 | Wong et al. | |
| 6,379,594 B1 | 4/2002 | Doepfner et al. | |
| 7,622,019 B2 | 11/2009 | You et al. | |
| 2004/0256065 A1 | 12/2004 | Ahmed et al. | |
| 2006/0070295 A1 | 4/2006 | Huang et al. | |
| 2006/0289135 A1 | 12/2006 | Grant et al. | |
| 2007/0056702 A1 | 3/2007 | Altheimer | |
| 2007/0062656 A1 | 3/2007 | Murray et al. | |
| 2007/0202283 A1 | 8/2007 | Meazle et al. | |
| 2008/0046277 A1 | 2/2008 | Stamets | |
| 2008/0057547 A1* | 3/2008 | You .......................... D01F 9/00 435/101 |
| 2008/0081135 A1 | 4/2008 | Spurrell | |
| 2008/0271866 A1 | 11/2008 | Hong et al. | |
| 2010/0108279 A1 | 5/2010 | Schall et al. | |
| 2011/0036525 A1 | 2/2011 | Kim et al. | |
| 2011/0052881 A1 | 3/2011 | Netravali et al. | |
| 2011/0132559 A1 | 6/2011 | Haehnle et al. | |
| 2011/0212293 A1 | 9/2011 | Han et al. | |
| 2012/0006501 A1 | 1/2012 | Golfman | |
| 2012/0018110 A1 | 1/2012 | Jiang | |
| 2012/0046277 A1 | 2/2012 | Tsukamoto et al. | |

FOREIGN PATENT DOCUMENTS

| | | |
|---|---|---|
| GB | 702025 A | 1/1954 |
| GB | 1 423 253 A | 2/1976 |
| GB | 1 474 219 A | 5/1977 |
| GB | 1 534 344 A | 12/1978 |
| KR | 2007-0040551 A | 4/2007 |
| KR | 2007-0040555 A | 4/2007 |
| KR | 10-2010-0011771 A | 2/2010 |
| WO | WO 1994/004745 A1 | 3/1994 |
| WO | WO 2007/004757 A1 | 1/2007 |
| WO | WO 2011/075830 A1 | 6/2011 |
| WO | WO 2012/010181 A1 | 1/2012 |
| WO | WO 2012/033998 A2 | 3/2012 |
| WO | WO 2012/114045 A1 | 8/2012 |
| WO | WO 2013/050436 A1 | 4/2013 |

\* cited by examiner

TREE-FREE FIBER COMPOSITIONS AND USES IN CONTAINERBOARD PACKAGING

PRIORITY

This non-provisional application is a continuation-in-part of and claims priority of U.S. patent application Ser. No. 13/631,183, filed on Sep. 28, 2012. The entirety of U.S. patent application Ser. No. 13/631,183 is incorporated herein by reference.

BACKGROUND

The present disclosure relates to the use of non-wood alternative natural fibers in corrugated medium for containerboard packaging. A replacement of the conventional hardwood fiber is achieved by a hybrid fibrous composition that provides sufficient mechanical strength for containerboard packaging applications.

Traditionally pulp derived from fast growing trees, such as pine, has been used as the raw material for containerboard packaging. The containerboard includes linerboard and medium. The linerboard is usually made from softwoods, which have the longest fibers and produce the strongest containerboard. The medium is made from hardwood fibers, which tend to be shorter and stiffer than softwood fibers. In recent years, the use of recycled, old corrugated container (OCC) material has grown in popularity as a linerboard or corrugated medium because of concerns about environmental sustainability. The OCC, however, frequently requires repulping and de-inking processes. As such, the recycled fibers get shortened, weakened, and contaminated as the number of recycles increases. Coupled with an increased demand and use of recycled fiber by many corrugated cardboard producers, the cost of recycled fiber has also increased. The move toward single stream recycling is causing an increase in contamination (staples, plastic tapes, and hot melt adhesives) of and the mixing of fibers in the existing recovered fiber streams. Critical performance requirements such as strength (compression, edge crush, burst, and tensile strength), stiffness, rigidity, moisture resistance, grease resistance, and freeze/thaw tolerance can be more difficult to achieve with recycled paper or paperboard.

These approaches rely on tree-based fibers. The ability to use fibrous feedstock that grows in a shorter lifecycle and to use residuals from agricultural or industrial processing can help to fulfill corporate sustainability goals and reduce environmental impact on forests as well as carbon footprint (measured in eCO2 units).

Hybrid fiber compositions, including non-wood alternative natural fibers such as those derived from seaweed, algae, corn stover, wheat straw, rice straw, bamboo, kenaf, and the like, can be an option to resolve such aforementioned issues by creating tree-free products. Fiber substitution in corrugated medium using land-based non-wood alternative fibers such as wheat straw alone can be challenging at a high level of inclusion. One of the factors is related to the fines associated with pulp fibers. Wheat straw fiber contains more fines (about 38% to about 50%) than hardwood (about 20% to about 40%) or OCC (about 20% to about 25%) fibers. This being the case, wheat straw fiber dimensions (fiber length and diameter) are comparable to hardwood fibers, such as those pulped from maple and oak, but shorter than OCC fibers due to the presence of softwood fibers in recycled containerboard materials. The fines could be viewed as a filler; however, having more fines from wheat straw pulp compared to others does not contribute to strength.

A previous approach (see U.S. Pat. No. 1,829,852 to Darling) used chopped wheat straw (not a fiber per se) to make cardboard. In another approach (see U.S. Patent Publication No. 2006/0070295 to Huang and Peng) described a non-woody fiber (corn or wheat) mulching mat for weed control in agricultural plantation and cultivation. Finally, chitosan in addition to agricultural residual fibers was used to improve the flat crush resistance of a corrugating medium (see U.S. Pat. No. 4,102,738 to Dzurik).

Therefore, there exists a need for providing wood-alternative pulp materials to replace conventional fiber materials used in containerboard packaging. Additionally, there is a growing need for stronger, lighter weight corrugated materials that allow for packaging weight reduction. Although some previous efforts have attempted to use alternative fibers to produce construction- and furniture-applied composite boards, there is a lack of sustainable attempts to produce non-wood natural fiber-based corrugated medium to be used in containerboard packaging applications. As a result, the present disclosure fills such gaps by providing wood-alternative materials that can be used for environmentally-sustainable containerboard packaging.

SUMMARY

The present disclosure relates to a containerboard packaging material including tree-free materials such as kenaf, wheat straw, corn stover, and/or red algae without hardwood pulp. The hybrid fibrous composition can be processed by existing papermaking, fluting, and case conversion machines for rigid packaging applications.

The results indicate corrugated medium can be made completely based on non-wood alternative fibers such as kenaf, wheat straw, miscanthus, corn stover, bamboo and red algal fiber. This disclosure describes tree-free corrugated medium, which is a significant contrast to current practices that rely on OCC, hardwood pulp, or a combination of both.

Presented is a containerboard packaging material including at least one linerboard layer including tree-based pulp material and at least one fluted medium layer including tree-free pulp material, wherein the tree-free pulp material is present in the medium layer in an amount of from about 5% to about 100%.

Also presented is containerboard packaging material including at least one linerboard layer including tree-based pulp material and at least one fluted medium layer made from medium layer pulp material, wherein the medium layer pulp material is tree-free pulp material.

Also presented is a containerboard packaging material including at least one linerboard layer including tree-based pulp material; and at least one fluted medium layer made from medium layer pulp material, wherein the medium layer pulp material is tree-free pulp material, and wherein the tree-free pulp material is wheat straw pulp and red algae pulp.

BRIEF DESCRIPTION OF THE DRAWINGS

The foregoing and other features and aspects of the present disclosure and the manner of attaining them will become more apparent, and the disclosure itself will be better understood by reference to the following description, appended claims and accompanying drawings, where:

Figure 1:
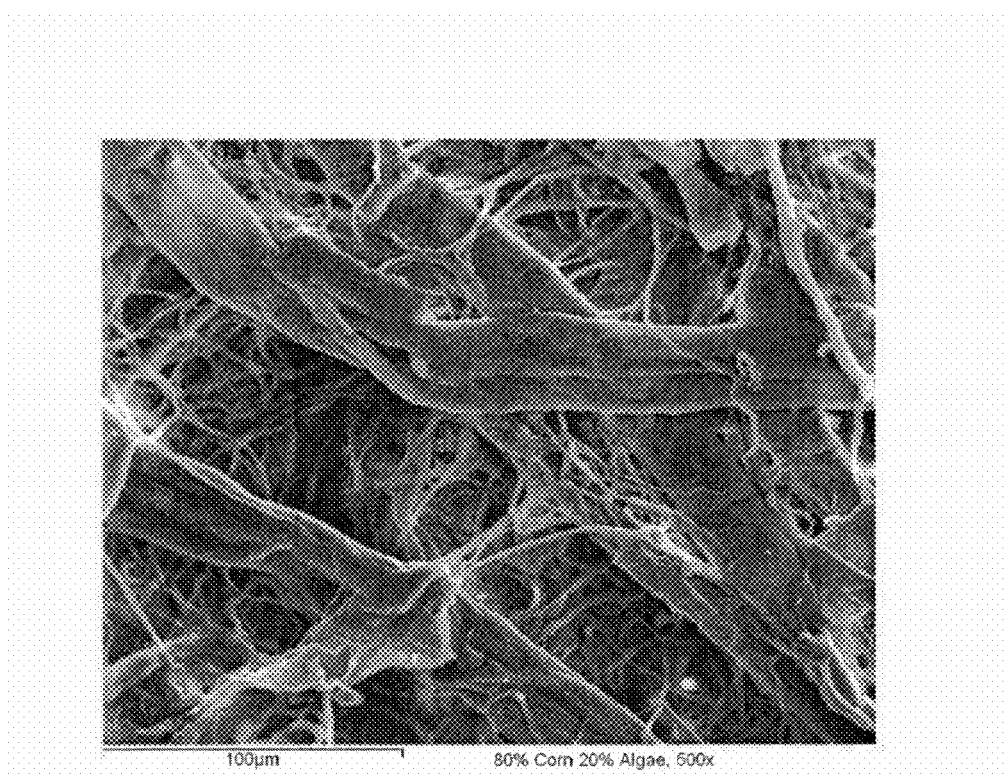
FIG. 1 shows a micrograph of a corn stover and red algal handsheet surface SEM at 500×.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

While the specification concludes with the claims particularly pointing out and distinctly claiming the disclosure, it is believed that the present disclosure will be better understood from the following description.

All percentages, parts and ratios are based upon the total weight of the compositions of the present disclosure, unless otherwise specified. All such weights as they pertain to listed ingredients are based on the active level and, therefore, do not include solvents or by-products that can be included in commercially available materials, unless otherwise specified. The term "weight percent" can be denoted as "wt. %" herein. Except where specific examples of actual measured values are presented, numerical values referred to herein should be considered to be qualified by the word "about."

As used herein, "comprising" means that other steps and other ingredients that do not affect the end result can be added. This term encompasses the terms "consisting of" and "consisting essentially of." The compositions and methods/processes of the present disclosure can comprise, consist of, and consist essentially of the essential elements and limitations of the disclosure described herein, as well as any of the additional or optional ingredients, components, steps, or limitations described herein.

As used herein, the terms "non-wood," "tree-free," and "wood alternative" generally refer to processing residuals from agricultural crops such as wheat straw, wetland non-tree plants such as bulrush, aquatic plants such as water hyacinth, microalgae such as Spirulina, and macroalgae seaweeds such as red or brown algae. Examples of non-wood natural materials of the present disclosure include, but are not limited to, wheat straw, rice straw, flax, kenaf, bamboo, cotton, jute, hemp, sisal, bagasse, hesperaloe, switchgrass, miscanthus, marine or freshwater algae/seaweeds, and combinations thereof.

As used herein, the term "red algae fiber" refers to any cellulosic fibrous material derived from Rhodophyta as described herein. Particularly preferred red algae fiber include cellulosic fibrous material derived from *Gelidium corneum, Gelidium amansii, Gelidium robustum, Gelidium chilense*, and *Gelidium asperum*. Red algae fibers generally have an aspect ratio (measured as the average fiber length divided by the average fiber width) of at least about 80.

As used herein, the term "OCC" refers to old corrugated containers that have layers of paper glued together with a fluted inner layer. This is the material used to make corrugated cardboard boxes (the most recycled product in the country). Four main components of the OCC pulps are unbleached softwood kraft pulp (mainly from the linerboard), semi-chemical hardwood pulp (from the fluted medium), starch (as an adhesive), and water (often 8% or more).

As used herein, the term "pulp" or "pulp fiber" refers to fibrous material obtained through conventional pulping processes known in the arts. This can be for woody and non-woody materials.

As used herein, the term "fines" refer to the fraction that passes through a 200 mesh screen (75 μm). The median size of fines is a few microns. Fines consist of cellulose, hemicellulose, lignin, and extractives. There are two types of the fines: primary and secondary fines. The primary fines content seems to be a genetic characteristic of the plant. For hardwood pulp, it is about 20% to about 40%, whereas for wheat straw, it is about 38% to about 50%. The secondary fines are pieces of fibrils from the outer layers of fibers that are broken off during refining.

As used herein, the term "basis weight" generally refers to the weight per unit area of a linerboard or medium. Basis weight is measured herein using TAPPI test method T-220. A sheet of pulp, commonly 30 cm×30 cm or of another convenient dimension is weighed and then dried to determine the solids content. The area of the sheet is then determined and the ratio of the dried weight to the sheet area is reported as the basis weight in grams per square meter (gsm). Linerboard basis weight is at least about 130 grams per square meter (gsm) or greater and medium basis weight is about 90 gsm or greater. The moisture content for linerboard and medium is less than about 10 percent.

As used herein, the term "containerboard" refers to a sheet containing linerboard as a facing and a fluted medium. There are multiple configurations: single face, single wall or double face, double wall, and triple wall for different product packaging applications.

As used herein, the term "flute" refers to an inverted S-shaped "arch" or "wave" of a corrugated medium that normally runs parallel to the depth of the container and gives the container rigidity and crushing (stacking) strength. Flutes of the present disclosure can range from about 98 flutes per meter to about 492 flutes per meter. The major five classifications and sizes of flutes are: 1) A-flute: the highest arch size, between about 105 to about 121 flutes per meter, 2) B-flute: second highest arch size, about 148 to about 171 flutes per meter, 3) C-flute: intermediate between A and B, between about 128 to about 141 flutes per meter, 4) E-flute: has about 302 to about 322 flutes per meter, and 5) F-flute: the latest flute size, about 420 flutes per meter. These flutes can also be combined to form multi-flute grades ranging from AAA (triple wall), AA (double wall) through E/F (Micro flute) combinations. Single flute heights range from A (0.477 cm) to F (0.079 cm).

Figure 3A:
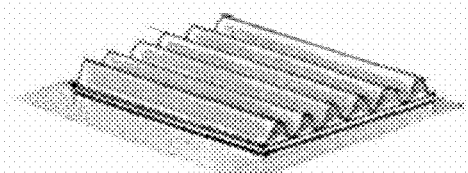
FIGS. 3a-3d show schematic representations of various arrangements of containerboard in the present application.
Figure 3B:
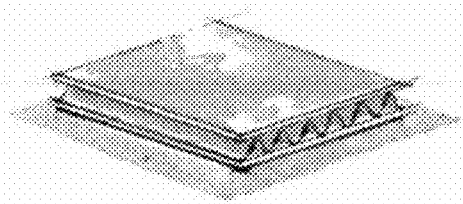
Figure 3C:
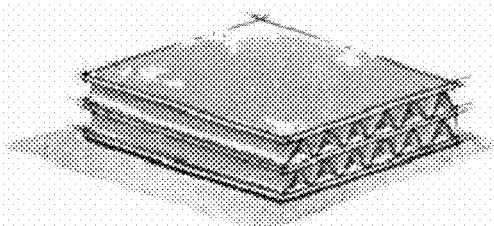
Figure 3D:
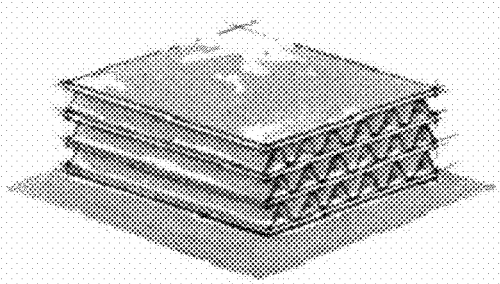

As used herein, the terms "single face," "single wall," "double wall," and "triple wall" refer to packaging material formed by gluing one or more fluted sheets of paperboard (corrugating medium) to or between one or more linerboard facings. There are four common types:

1) "Single Face" refers to one fluted medium glued to one flat sheet of linerboard (total two sheets), as illustrated in FIG. 3a.
2) "Single Wall" refers to one fluted medium glued between two sheets of linerboard. Also known as "double face" (total three sheets), as illustrated in FIG. 3b.
3) "Double Wall" refers to two fluted mediums glued between three sheets of linerboard (total five sheets), as illustrated in FIG. 3c.
4) "Triple Wall" refers to three fluted mediums glued between four sheets of linerboard (total seven sheets), as illustrated in FIG. 3d.

As used herein, the term "Tensile Index" is expressed in Nm/g and refers to the quotient of tensile strength, generally expressed in Newton-meters (N/m) divided by basis weight.

As used herein, the term "Burst Index" refers to the quotient of burst strength, generally expressed in kilopascals (kPa) divided by basis weight, generally expressed in grams per square meter (gsm).

As used herein, the term "corrugated medium test" (CMT) refers to the crushing resistance of a fluted strip of corrugating medium, generally expressed in pound-force (lbf) or Newton (N).

As used herein, the term "ring crush" refers to the resistance of the paper and paperboard to edgewise compression, generally expressed in kilonewton per meter (kN/m).

As used herein, the term "compression" refers to the ability of corrugated shipping containers to resist external compressive forces, which is related to the stacking strength of the containers being subjected to forces encountered during transportation and warehousing. It is generally expressed in Newton (N).

As used herein, the term "edge crush" refers to the edgewise compression strength, parallel to the flutes of the corrugated board, generally expressed in kilonewton per meter (kN/m).

As used herein, the term "web-forming apparatus" generally includes fourdrinier former, twin wire former, cylinder machine, press former, crescent former, and the like, known to those skilled in the arts.

As used herein, the term "Canadian standard freeness" (CSF) refers generally to the rate at which slurry of fibers drains and is measured as described in TAPPI standard test method T 227 OM-09. The unit for the CSF is mL.

A major problem affecting pulp and paper industries worldwide is the increasing cost of suitable wood fiber resulting from concerns about competing uses for forest lands, environmental impact of forest operations, and sustainable forest management. In recent years, major tissue manufacturers have been motivated to examine alternative utilization of non-wood natural fibers for product manufacturing due to sustainability issues related to commodity pulp. Reducing reliance on commodity wood pulp can also alleviate pressure from NGO and consumers who prefer to use green products. Use of the recycled fibers, however, in a variety of products is technically limited by the end product quality acceptable to users.

Recycled fibers can be derived from any paper and board that has been collected for reuse as raw fiber material in paper and board manufacturing. Conversely, commodity wood pulps are classified into softwood pulp derived from softwood trees such as spruce, pine, fir, larch and hemlock, and hardwood pulp derived from hardwood trees such as eucalyptus, aspen and birch.

This disclosure focuses on using a hybrid fiber composition obtained from pulping or bleaching of wheat straw, corn stover, kenaf, seaweed, etc., obtained by chemical, mechanical, or combined means for a corrugating medium to be used in containerboard packaging applications. This is significantly different from composite boards for construction of fiberboard, building, houses, and furniture applications. A combination of red algae, wheat straw, kenaf, corn stover, etc., pulp provides tree-free structures that display acceptable properties for the corrugated medium.

Pulping processes for non-wood natural fibers are raw-material-dependent; detailed steps can be found in Sridach, W. (2010), The Environmentally Benign Pulping Process of Non-wood Fibers, Suranaree J. Sci. Technol., 17(2), 105-123. For example, red algae pulp can be processed by simple bleaching steps with much less energy and capital cost, partially because there is no presence of lignin (Seo, Y. B. et al. (2010), Red Algae and Their Use in Papermaking, Bioresource Technology, 101, 2549-2553).

Use of alternative non-wood natural fibers such as using field crop fibers and agricultural residues instead of wood fibers is considered more sustainable, due in part to the classification of these materials as by-products of or waste from other processes. Suppliers can pay customers to help them dispose of these materials. Examples of such raw natural materials are kenaf, flax, bamboo, cotton, jute, hemp, sisal, bagasse, corn stover, rice straw, wheat straw, hesperaloe, switchgrass, reed, arundo donax, marine or fresh water algae/seaweeds, or aquatic plants such as water hyacinth. Non-wood fiber sources account for only about 5-10% of global pulp production for a variety of reasons including seasonal availability, problems with chemical recovery, brightness of the pulp, silica content, etc.

Straws (e.g., wheat, rice, oat, barley, rye, flax and grass) and stalks (e.g., corn, sorghum and cotton) represent potential worldwide large sources (more than 1 million dry metric tons annually) of agricultural crop-based alternative natural fibers. With any annual crop, harvesting must be done at a certain time and storage, drying, cleaning, and separating are needed prior to product manufacturing. Advantages of using annual growth lignocellulosic fibers for corrugated medium applications are 1) a much shorter harvest cycle than traditional wood-based pulp sources, 2) low cost due to its residual nature, 3) no need of fiber bleaching, requiring less energy consumption, and 4) pulling carbon dioxide out of the air to reduce global greenhouse gas effect (i.e., reduced overall "carbon footprint" or eCO2 values as can be shown from an LCA calculation). These advantages enhance environmental sustainability.

The present disclosure describes using at least one non-wood or tree-free alternative pulp material in containerboard packaging to replace a major portion of conventional fiber materials, particularly in the medium layer. The composition of the present disclosure includes at least one non-wood alternative pulp material selected from seaweeds such as red algae, corn stover, straw, other land-based natural fibers, and combinations thereof. Red algae can include *Gelidium elegance, Gelidium corneum, Gelidium amansii, Gelidium robustum, Gelidium chilense, Gelidium asperum, Gracelaria verrucosa, Eucheuma Cottonii, Eucheuma Spinosum*, beludulu, and combinations thereof. The straw can include wheat, rice, oat, barley, rye, flax, grass, and combinations thereof. The other land-based natural fibers can include flax, bamboo, cotton, jute, hemp, sisal, bagasse, kenaf, hesperaloe, switchgrass, miscanthus, and combinations thereof. The individual fibrous material from those non-wood materials can be derived from conventional pulping processes such as thermal mechanical pulping, kraft pulping, chemical pulping, enzyme-assisted biological pulping or organosolv pulping known in the art.

Red algae pulping (see U.S. Pat. No. 7,622,019 to You et al.) involves less energy and capital cost because it does not contain lignin, which makes red algae distinctively different from other pulp materials. Additionally, a low basis weight is achievable when red algal fiber is used in hybrid compositions.

Corrugated or fluted medium is typically made with a semi-chemical pulp or recycled material. About 75% of production within the current production practices uses about 80% semi-chemical pulp and 20% recycled fiber. The remainder of the production is made of 100% recycled material and is often termed "bogus medium." Corrugated medium is a lightweight board used for the fluted inner plies of corrugated box stock. The basis weight for corrugating medium ranges from about 18 pounds to about 36 pounds per 1000 ft$^2$. The preferred basis weight is about 26 to about 32 pounds per 1000 ft$^2$. The corrugated medium of the present disclosure can have a basis weight from about 90 g/m$^2$ to about 200 g/m$^2$. Overall mechanical properties of the corrugated medium and containerboard can be improved with the use of non-wood alternative natural fibers, as illustrated in the examples below.

Red algae is an example of a seaweed that can be used in the present disclosure. Red algae belongs to the division Rhodophyta, a part of the Gelidiaceae family. Red algae fiber obtained after agar or bioethanol extraction has a high aspect ratio and surprisingly enhances corrugating medium mechanical properties such as tensile index, ring crush, burst index and tear index, etc., in hybrid fiber compositions. The presence of red algae fiber enables corrugated medium to meet or exceed the primary mechanical property requirements. This allows a high proportion of non-wood fibers, such as wheat straw, to be effectively used yet still fully meet product performance demands. Thus, the use of non-wood alternative fibers would be more eco-friendly, represent a significant shift from the use of conventional raw materials (hardwood pulp or OCC), and result in potential cost savings to various manufacturers.

The pulp material compositions of the present disclosure can include various amounts of non-wood alternative natural pulp fibers. The composition can have a combination of elements where there is at least one non-wood alternative natural pulp fiber alone or it can be combined with a wood pulp fiber. For example, the amount of non-wood alternative natural pulp fibers of the present disclosure can be present in an amount of from about 5%, from about 10%, from about 20%, from about 25%, from about 30% to about 40%, to about 50%, to about 60%, to about 75%, to about 100% by weight of the composition. The pulp material compositions of the present disclosure can also include a hardwood, short fiber pulp in an amount of from about 5%, from about 10%, from about 20%, or from about 30%, to about 40%, to about 50%, to about 60% or to about 70%, by weight of the composition. When the non-wood alternative pulp materials are present alone, in combination with each other or in combination with a wood pulp fiber, the composition can then be used for a containerboard packaging that replaces a portion of conventional fiber materials.

Compositions of the present disclosure can show combinations, although not limited to, wherein the chemical hardwood pulp to non-wood alternative natural pulp ratio can be from about 70:30, from about 60:40, from about 50:50, from about 30:70, from about 5:95 or from about 0:100. Any of the non-wood alternative natural pulps can use one type of non-wood alternative natural pulp or two or more in combination. For example, a composition can include a 30:70 ratio of hardwood:non-wood alternative natural pulp wherein the non-wood alternative is wheat straw alone or a combination of wheat straw and red algae. As mentioned, any combination of non-wood alternative natural pulps can also be used.

This disclosure was further demonstrated through corrugated medium papermaking, fluting, and case conversion. For example, in papermaking, aspects of hardwood pulp and wheat straw (30:70) and 100% OCC papers at a low basis weight of 112 g/m$^2$ were made as a basis for comparison, respectively. Another example of the same 30% hardwood inclusion with a balance of 70% combination of wheat straw and red algae (85.7:14.3) was made on a pilot paper machine. A cationic starch was used as a dry strength additive from about 0.1%, from about 0.5%, from about 0.1% to about 2%, to about 5%, by weight of the composition. Any starch derived from corn, wheat or potato, etc., would be suitable after cationic modification.

Water soluble corn starch-based adhesives and some resins such as polyvinyl acetate can be used as adhesives in attaching the linerboard to the fluted medium. Flutes come in several standard shapes or flute profiles. Different flute profiles can be combined in one piece of combined board. For instance, in a triple wall board (see e.g., FIG. 3d), one layer of medium might be A-flute while the other two layers can be C-flute. Mixing flute profiles in this way allows designers to manipulate the compression strength, cushioning strength, and total thickness of the combined board.

Case sizes of 34.4 cm×34.3 cm×39.1 cm. were converted using containerboard sheets by a flexo-folder-gluer press with scores and slots applied prior to gluing of manufacturer joint. Several tests such as edge crush, ring crush and three dimensional compression tests [top to bottom (T-B), end to end (E-E) and side to side (S-S)] were selected to evaluate corrugated containerboard boxes. The results for the corrugated medium containing non-wood natural fibers all exceed control samples.

EXAMPLES

The following examples further describe and demonstrate aspects within the scope of the present disclosure. The examples are given solely for the purpose of illustration and are not to be construed as limitations of the present disclosure, as many variations thereof are possible. The results indicate corrugated medium can be made totally based on non-wood alternative fibers such as kenaf, wheat straw, miscanthus, corn stover, bamboo and red algal fiber. This disclosure is about tree-free corrugated medium, which is a significant contrast to the current practice that relies on OCC, hardwood pulp, or a combination of both.

A mixture of virgin hardwood pulp, including 40% poplar aspen, 30% birch, and 30% maple, was used as a control. OCC after re-pulping was also used as a control. Blends of hardwood pulp:OCC (70:30 and 20:80) were made and tested, respectively.

Wheat straw pulp was obtained via a simplified APMP (alkali peroxide mechanical pulping) using raw wheat straw collected from North Carolina in 2012. The wheat straw pulp has CSF (Canadian standard freeness) of 250 mL.

The whole kenaf [bast:core (35:65)] as grown and blended kenaf bast and core (70:30) pulps were obtained from a simplified APMP pulping, respectively. CSF for the whole kenaf and blended kenaf pulps are all 300 mL, respectively.

Corn stover pulp was supplied by USDA Forest Products Laboratory in Madison, Wis. Red algae pulp in a wet lap was obtained from Pegasus International, Daejeon, Republic of Korea.

TAPPI standard T205 was followed to make all handsheets for this disclosure, with the exception of the basis weight being targeted at about 112 or 120 g/m² to replicate a range of basis weights for the corrugated mediums.

All handsheet samples were tested for their mechanical properties (tear, tensile, burst and density) (TAPPI standard T220), ring crush (T822), corrugated medium testing (T809) and STFI (T826). At least five replicates (n=5) were tested to produce the reported averaged values for each parameter. All samples were conditioned at 50% humidity and 75° F. for 24 hours prior to performing any tests.

Scanning electron microscopy (SEM) images of the selected handsheets were obtained using the JSM-6490LV scanning electron microscope under the following operating conditions: accelerating voltage is 10 kilovolts; spot size is 40, working distance 20 millimeters, and magnification 300× to 500×.

Control Examples

Five handsheets including virgin hardwoods and recycled fiber (70:30) were made for each code according to TAPPI T205 and the handsheet basis weights were targeted to be 112 grams per square meter (gsm) with an oven dry weight of 2.24 grams for each handsheet.

Five handsheets including virgin hardwoods and recycled fiber (20:80) were made similarly and used as controls. Their respective testing results are shown in Table 1.

TABLE 1

Control Handsheet Mechanical Properties

| Sample Code | Control Composition | | Tensile | | Ring | |
|---|---|---|---|---|---|---|
| | % Hardwoods | % OCC | Index (N · m/g) | STFI (kN/m) | Crush kN/m | CMT (N) |
| Control Example 1 | 70 | 30 | 17.3 | 1.5 | 0.46 | 52 |
| Control Example 2 | 20 | 80 | 31.4 | 2.06 | 0.64 | 100 |

Examples 1 to 8

As shown in Table 2, Examples 1 to 8 were made using red algae, whole kenaf, and wheat straw pulp fibers. The handsheet basis weight for Examples 1 to 8 is 112 g/m². The fibrous composition is for 100% non-wood natural material without any presence of hardwood pulp for corrugated medium. All mechanical properties are better than those for the control materials shown in Table 1.

TABLE 2

Whole Kenaf, Wheat Straw, and Red Algal Handsheet Mechanical Properties

| Sample Code | Composition Design 1 | | | Tensile Index (N · m/g) | STFI (kN/m) | Ring Crush kN/m | CMT (N) |
|---|---|---|---|---|---|---|---|
| | % Red Algae | % Whole Kenaf | % Wheat Straw | | | | |
| Example 1 | 5 | 30 | 65 | 36.7 | 3.39 | 1.10 | 104.4 |
| Example 2 | 5 | 42 | 53 | 35.2 | 3.36 | 1.17 | 119.6 |
| Example 3 | 5 | 50 | 45 | 30.3 | 3.17 | 1.21 | 134.7 |
| Example 4 | 10 | 50 | 40 | 31.1 | 3.35 | 1.28 | 126.7 |
| Example 5 | 11 | 39 | 50 | 34.8 | 3.91 | 1.29 | 138.7 |
| Example 6 | 13 | 30 | 57 | 35.9 | 3.55 | 1.29 | 113.3 |
| Example 7 | 20 | 30 | 50 | 31.6 | 3.81 | 1.27 | 133.8 |
| Example 8 | 20 | 40 | 40 | 31.7 | 3.5 | 1.19 | 114.7 |

Examples 9 to 16

As shown in Table 3, Examples 9 to 16 were made using red algae, blended kenaf bast and core (70:30), and wheat straw pulp. The handsheet basis weights for Examples 9 to 16 were 112 g/m². The fibrous composition is for 100% non-wood natural material without any presence of hardwood pulp for corrugated medium. Again, all sample mechanical properties are better than those for the control materials shown in Table 1.

TABLE 3

Blended Kenaf Bast/Core, Wheat Straw, and Red Algal Handsheet Mechanical Properties

| Sample Code | Composition Design 2 | | | Tensile Index (N · m/g) | STFI (kN/m) | Ring Crush kN/m | CMT (N) |
| --- | --- | --- | --- | --- | --- | --- | --- |
| | % Red Algae | % Wheat Straw | % Blended Kenaf | | | | |
| Example 9 | 5 | 30 | 65 | 39.0 | 3.46 | 1.25 | 185.8 |
| Example 10 | 5 | 42 | 53 | 40.2 | 3.21 | 1.26 | 148.9 |
| Example 11 | 5 | 50 | 45 | 37.2 | 3.5 | 1.42 | 135.1 |
| Example 12 | 10 | 50 | 40 | 43.7 | 3.76 | 1.18 | 141.3 |
| Example 13 | 11 | 39 | 50 | 41.1 | 3.69 | 1.09 | 149.3 |
| Example 14 | 13 | 30 | 57 | 44.0 | 3.9 | 1.34 | 136.4 |
| Example 15 | 20 | 30 | 50 | 39.1 | 3.68 | 1.33 | 152.9 |
| Example 16 | 20 | 40 | 40 | 45.9 | 3.78 | 1.52 | 128.9 |

Example 17

Wheat straw pulp (80%) and red algae fiber (20%) were used to create handsheets containing 100% non-wood alternative natural fibers. This example demonstrates the use of wheat straw and red algae without the presence of kenaf. The handsheet basis weight is 124 g/m$^2$. The testing results are shown together with those from Examples 18 to 19 in Table 4.

Examples 18 and 19

Corn stover pulp and red algae fiber were blended (at 90:10 and 80:20, respectively) to make handsheets. The testing results are shown in Table 4. In comparison to corn stover and red algal fiber handsheets, wheat straw and red algal fiber handsheets displayed stronger mechanical properties. The handsheet basis weight was 120 g/m$^2$. FIG. 1 illustrates a handsheet SEM for Example 19 including 80% corn stover fiber and 20% red algal fibers, where the magnification is 500×.

TABLE 4

Wheat Straw/Red Algae and Corn Stover/Red Algal Handsheet Mechanical Properties

| Sample Code | Nonwoody Fiber Composition | | | Tensile Index (N · m/g) | STFI (kN/m) | Ring Crush kN/m | CMT (N) |
| --- | --- | --- | --- | --- | --- | --- | --- |
| | % Wheat Straw | % Corn Stover | % Red Algae | | | | |
| Example 17 | 80 | | 20 | 58.1 | N/A | 1.37 | 248.9 |
| Example 18 | | 90 | 10 | 69.9 | 2.26 | 1.12 | 164.6 |
| Example 19 | | 80 | 20 | 73.6 | 2.56 | 1.13 | 186.8 |

Examples 20 to 22

Figure 2:
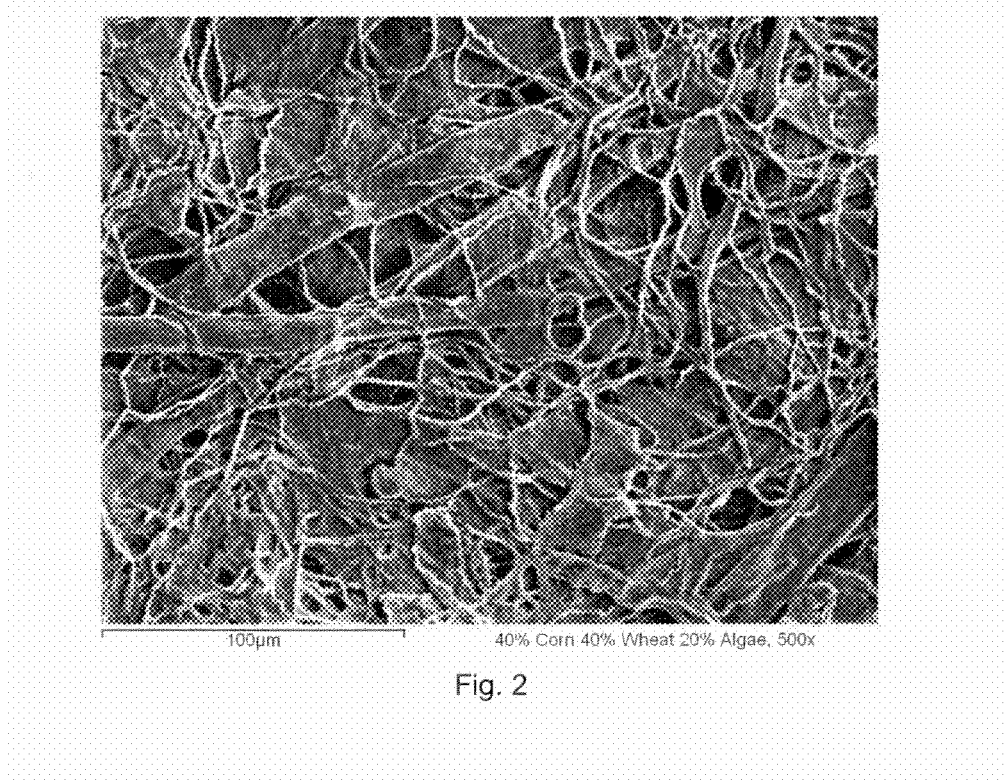
FIG. 2 shows a micrograph of a hybrid of corn stover, wheat straw, and red algal handsheet surface SEM at 500×.

Corn stover, wheat straw, and red algae were used to make handsheets. Each fiber content and corresponding handsheet testing data is shown in Table 5, which indicates that the tensile index, STFI, CMT, and ring crush are all enhanced as red algal fiber increased from zero to 20% in the handsheets. The handsheet basis weight for Examples 20 to 22 was 120 g/m$^2$. FIG. 2 illustrates a handsheet SEM for Example 22, including 40% corn stover, 40% wheat straw, and 20% red algal fibers, where the magnification for the SEM is 500×.

TABLE 5

Wheat Straw, Corn Stover, and Red Algal Handsheet Mechanical Properties

| Sample Code | Hybrid Fiber Composition | | | Tensile Index (N · m/g) | STFI (kN/m) | Ring Crush kN/m | CMT (N) |
| --- | --- | --- | --- | --- | --- | --- | --- |
| | % Wheat Straw | % Corn Stover | % Red Algae | | | | |
| Example 20 | 50 | 50 | | 80.7 | 2.75 | 1.21 | 182.4 |
| Example 21 | 45 | 45 | 10 | 82.7 | 2.87 | 1.20 | 213.5 |
| Example 22 | 40 | 40 | 20 | 90.8 | 3.08 | 1.17 | 235.8 |

Packaging Applications

Construction of containerboard for packaging applications includes linerboard and corrugated medium, both of which are made from containerboard. Linerboard is the flat facing that adheres to the medium. The medium is the wavy, fluted paper attached to or between the liners. The layers can be glued together using water soluble cornstarch based adhesives and some resins. There are several configurations as shown in FIGS. 3a-3d.

In a Single Face construction (FIG. 3a), one medium of this disclosure including non-wood alternative fibers of wheat straw and red algae (Example 5 or similar) is glued to one flat sheet of linerboard made from kraft softwood long fibers by fourdrinier processes. Others shown below are similar but different in configurations. In a Single Wall construction (FIG. 3b), the medium is between two sheets of linerboard. This construction is also known as Double Face. Double Wall construction (FIG. 3c) includes three sheets of linerboard with two mediums in between. Triple Wall construction (FIG. 3d) includes four sheets of linerboard with three mediums in between.

Flutes come in several standard shapes or flute profiles. Different flute profiles can be combined in one piece of combined board. For instance, in a triple wall board, one layer of medium might be A-flute while the other two layers can be C-flute. Mixing flute profiles in this way allows designers to manipulate the compression strength, cushioning strength and total thickness of the combined board.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular aspects of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A containerboard packaging material comprising:
at least one paper linerboard layer including 50%-95% by weight tree-based pulp material; and
at least one fluted medium layer including tree-free pulp material, wherein the tree-free pulp material is present in the medium layer in an amount of from about 80% to about 100%, the tree-free pulp material including
a first tree-free pulp material selected from the group consisting of corn stover, straw, other land-based natural fibers, and combinations thereof and present in an amount of from about 10% to about 60%, and
a second tree-free pulp material selected from seaweed and present in an amount of from about 5% to about 30%.

2. The containerboard packaging material of claim 1, wherein the tree-free pulp material is present in the medium layer in an amount of from about 95% to about 100%.

3. The containerboard packaging material of claim 1, wherein the seaweed is red algae selected from *Gelidium elegance, Gelidium corneum, Gelidium amansii, Gelidium robustum, Gelidium chilense, Gelidium asperum, Gracelaria verrucosa, Eucheuma Cottonii, Eucheuma Spinosum*, beludulu, and combinations thereof.

4. The containerboard packaging material of claim 1, wherein the straw is selected from the group consisting of wheat, rice, oat, barley, rye, flax and grass, and combinations thereof.

5. The containerboard packaging material of claim 1, wherein the other land-based natural fibers are selected from flax, bamboo, cotton, jute, hemp, sisal, bagasse, kenaf, hesperaloe, switchgrass, miscanthus, and combinations thereof.

6. The containerboard packaging material of claim 1, comprising from about 20% to about 100% of wheat straw and red algae pulp combined.

7. The containerboard packaging material of claim 1, comprising from about 5% to about 30% seaweed red algae pulp and from about 70% to about 95% other tree-free fibers.

8. The containerboard packaging material of claim 1, wherein the fluted medium layer has a basis weight from about 90 g/m$^2$ to about 200 g/m$^2$.

9. The containerboard packaging material of claim 1, further comprising an adhesive selected from starch, polyvinyl acetate, and combinations thereof.

10. The containerboard packaging material of claim 1, wherein the fluted medium layer includes flutes ranging in size from about 98 flutes per meter to about 492 flutes per meter.

11. The containerboard packaging material of claim 1, wherein the tree-free pulp material is wheat straw pulp and red algae pulp.

* * * * *